Jan. 14, 1930.                    E. A. RINEHART                    1,743,395
                                  WINDSHIELD WARMER
                              Filed May 24, 1928            3 Sheets-Sheet 1
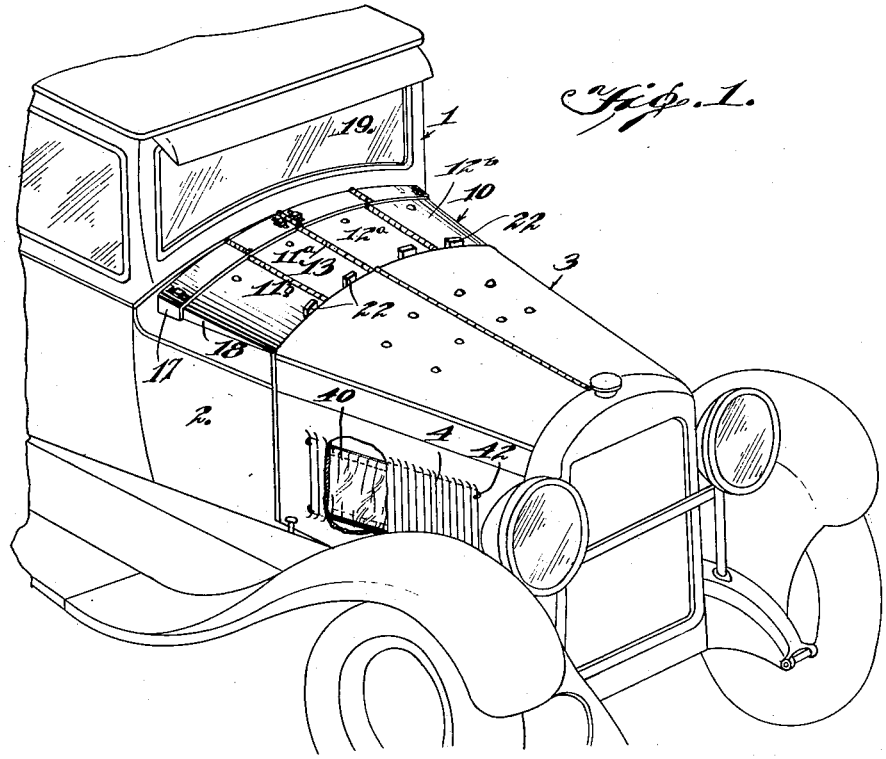
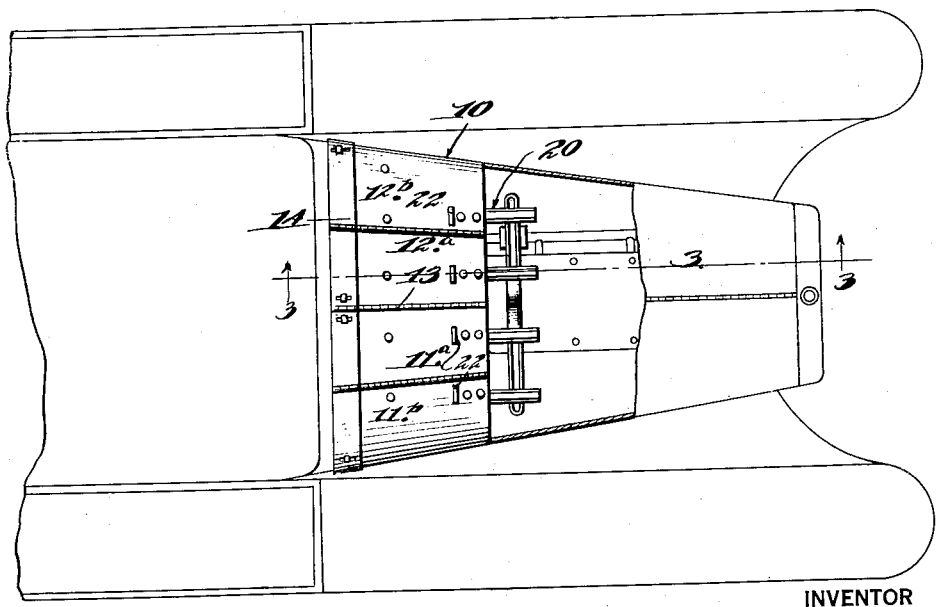
INVENTOR
E. A. Rinehart,
BY
ATTORNEY

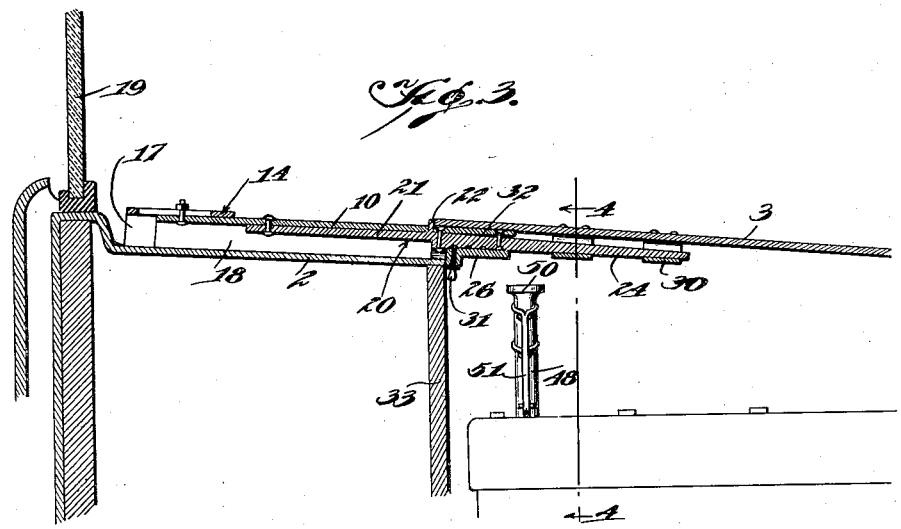
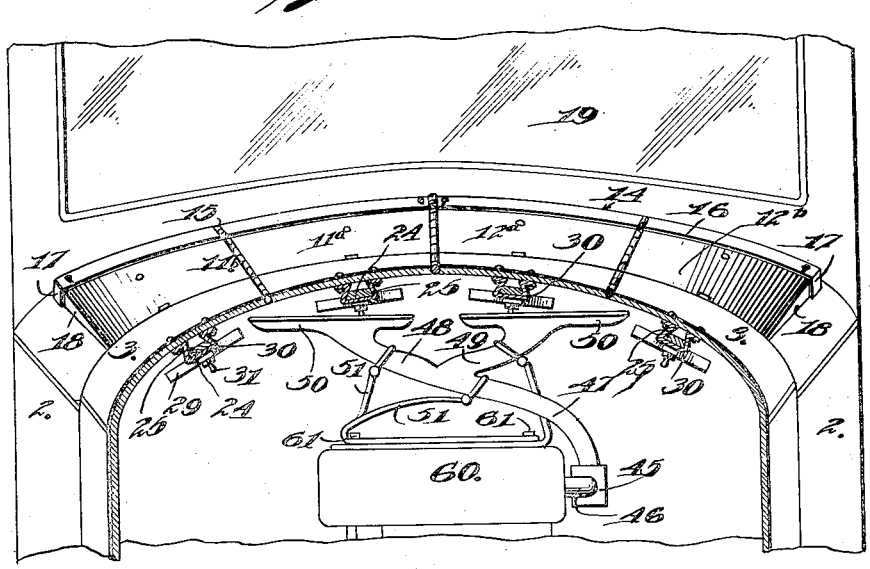
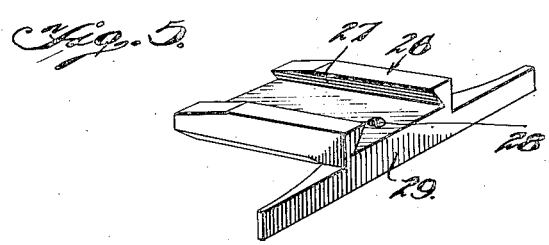

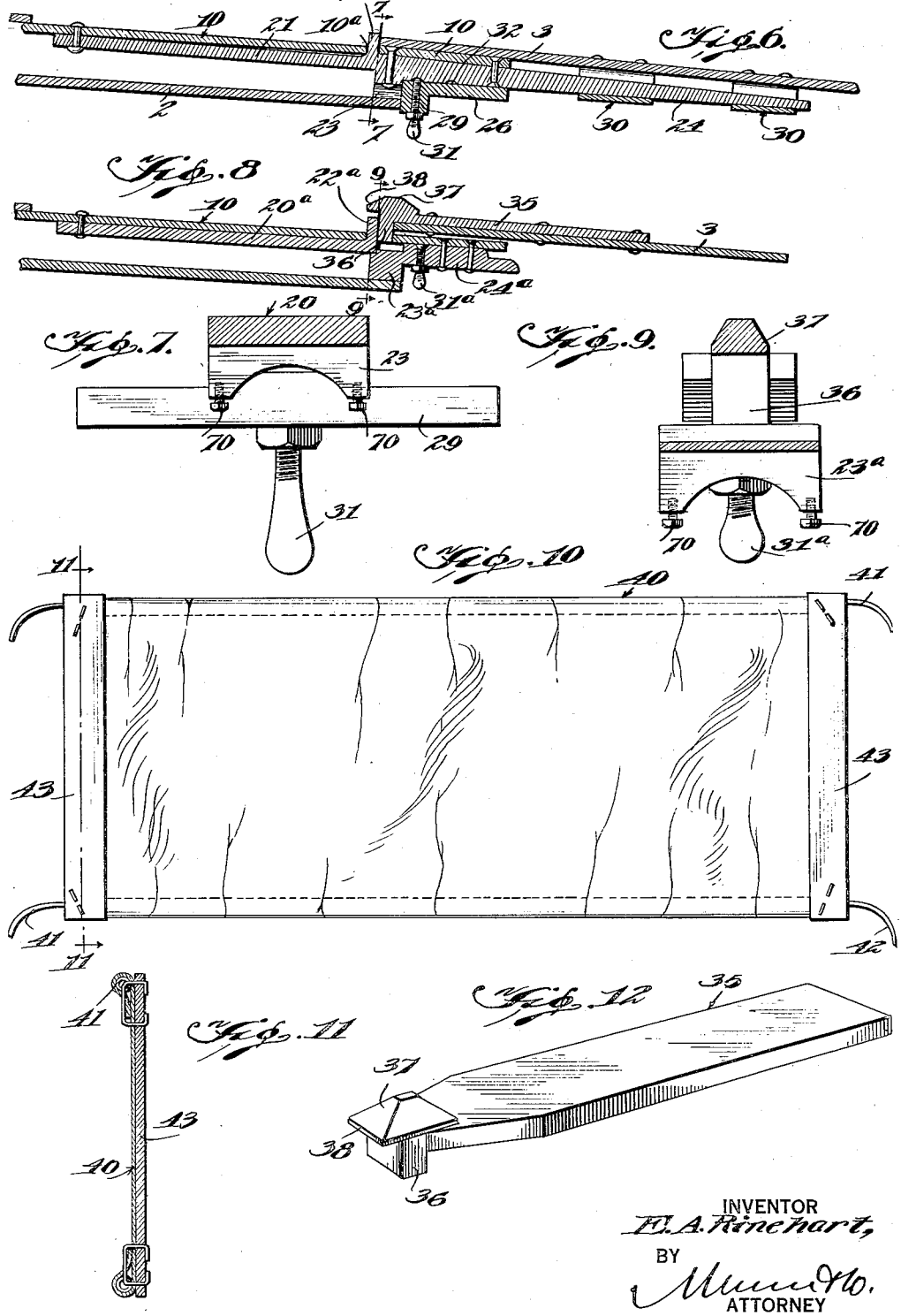

Patented Jan. 14, 1930

1,743,395

UNITED STATES PATENT OFFICE

ERWIN A. RINEHART, OF CHILOQUIN, OREGON

WINDSHIELD WARMER

Application filed May 24, 1928. Serial No. 280,266.

This invention relates to windshield warmers for motor vehicles.

A primary object of the invention is to provide a device of this character for use in driving in cold weather to prevent ice and snow from adhering to the windshield and also to prevent fog and moisture from collecting inside and ice and snow on the outside of the shield.

Another object of the invention is to so construct such a device that the hot air from the engine may be directed onto the windshield, thereby accomplishing the objects above set forth.

Still another object is to provide simple and efficient means for directing heat from any source onto the windshield against either face thereof for preventing the accumulation of frost and snow or ice thereon.

Another object is to provide a device of this character which may be quickly attached to a car without changing the structure thereof and which is adjustable to admit more or less hot air to impinge against the windshield as may be desired.

In carrying out these objects, the invention is susceptible of a wide range of modification without departing from the spirit or sacrificing any of the advantages of the claimed invention there being shown in the drawings for illustrative purposes a preferred and practical form in which;

Figure 1 represents a perspective view of the front portion of an automobile with this improved windshield warmer shown applied;

Fig. 2 is a plan view thereof with a portion of the hood broken away;

Fig. 3 is a longitudinal section taken on the line 3—3 of Fig. 2;

Fig. 4 is a transverse vertical section taken on the line 4—4 of Fig. 3;

Fig. 5 is a detail perspective view of one of the guide members used in the invention;

Fig. 6 is a longitudinal section through a portion of a hood of an automobile and through the top of the cowl with this improved device applied and in section;

Fig. 7 is a transverse vertical section taken on the line 7—7 of Fig. 6;

Fig. 8 is a view similar to Fig. 6 showing a slightly different form of the invention;

Fig. 9 is a transverse section taken on the line 9—9 of Fig. 8;

Fig. 10 is a side elevation of a curtain designed to be used in cutting off air from the slats in the hood;

Fig. 11 is a transverse section taken on the line 11—11 of Fig. 10, and

Fig. 12 is a detail perspective view of one of the clamping members shown in Fig. 7.

In the embodiment illustrated, a portion of an automobile is shown at 1 having the usual cowl 2 and hood 3, the latter having the ventilating slats 4 along the sides thereof.

The windshield warmer constituting this invention comprises a hot air deflector or director 10 shown located over the cowl 2 of the automobile and between the hood and the front portion of the car directly below the windshield. This warmer 10 is made in the form of an apron composed of detachably connected sections 11 and 12 of any suitable material and hingedly connected along their center as shown at 13 in a manner similar to the sections of the hood, and each section is composed of two hingedly connected members $11^a$, $11^b$ and $12^a$, $12^b$ to adapt the apron to be folded compactly when not in use. Mounted on the apron 10 is an extension apron 14 which is adjustable back and forth on the apron 10 to vary its position in regard to the windshield so as to admit more or less hot air as may be desired.

Attached to the lower face of the apron 10 in any suitable manner, riveting being here shown, are connections 20 designed for connecting the apron 10 with the hood 3. These connectors 20 as shown in Figs. 3, 6 and 7 comprise metal strips or bars 21 arranged on the lower face of the apron and riveted thereto, being provided midway or intermediate their length with upstanding lugs 22 which project through openings $10^a$ in the apron and which form abutments for the rear edge of the hood 3 when the parts are assembled, as is shown clearly in Figs. 3 and 6. On the lower face of these connectors 20 slightly in advance of the lugs 22 are depending legs 23 which are designed to rest on the upper face of the cowl 2 at the front thereof to form spacers and supports for holding the hood 3 above the cowl so as to permit the passage between them of hot air which may be, and preferably is, supplied from the engine. Adjustable elements in the form of set screws 70 are carried by the legs 23 and are designed for raising or lowering the rear end of the hood and the apron and thus control the amount of hot air to pass through the shield. The front portion of each connector 20 tapers in thickness toward its free end to provide a tongue 24 the edges of which are bevelled as shown at 25 to slidably fit in undercut keepers 30 secured to the lower face of the hood 3. Any desired number of these keepers may be provided, two being shown for each tongue.

Any desired number of these connectors 20 may be employed, four being here shown, two being mounted on each apron section, as illustrated in Fig. 2.

A slide 26 is also mounted on the tongue 24, preferably near the base thereof, and has undercut side walls 27 to fit the bevelled edges of the tongue and is provided with a wing bolt 31 which passes through an aperture 28 in the slide 26 and is designed to engage seats or sockets 32 on the lower face of the tongue, as is shown clearly in Fig. 3. The slide 26 is provided at its rear end with a cross bar 29 which projects at opposite ends beyond the sides of the slide and is designed to abut the front edge of the cowl 2 and the upstanding partition 33 arranged at the rear of the engine chamber whereby the apron 10 is held against longitudinal movement.

In the form shown in Figs. 8 and 9 the connector 28 has the rear portion thereof constructed similarly to the connectors 20 shown in the other figures, and is united with the apron 10 in the same manner, the difference being that it is connected with the hood by clamping means instead of by the sliding tongue and keeper connection above described. The front portion 24ª of the connector 20ª is riveted to the front end of the apron 10 and carries a wing bolt 31ª which is designed to bear against the apron and clampingly force it into engagement with the lower face of the hood 3 on the upper face of which is mounted a cooperating clamping member 35 provided at its rear end with a depending lug 36 which overhangs the rear end of the hood and is designed to enter an opening in the apron through which the lug 22ª extends. A head 37 is arranged above the lug 36 and has a rearwardly projecting lip 38 designed to overlie the upper end of the lug 22ª when the parts are assembled, as is shown clearly in Fig. 7.

The apron extension 14 overlies the upper face of apron 10 and is composed of two hingedly connected sections 15 and 16 having a bolt and slot connection with the sections 11 and 12 of the apron so that said extension may be adjusted toward and away from the apron to vary the space between the windshield and the apron for permitting the passage out of more or less hot air as may be desired. These sections 15 and 16, as well as the sections 11 and 12 have their side edges bent downwardly as shown at 17 and 18 respectively and said edges are designed to rest on the upper edge of the cowl 2 to space the apron above said cowl and provide a hot air chamber or passage for the air which is heated by the engine and discharged against the windshield, the latter being shown at 19.

Designed to be arranged under the ventilation slats 4 of the hood at opposite sides thereof are curtains, one of which is shown at 40 and composed of any suitable fireproof fabric provided along its upper and lower edges with combined reinforcing and attaching elements 41 provided at their terminals with hook-like ends 42 designed to be engaged with the slats as is shown clearly in Fig. 1 and which operate to shut out the cold air so that a maximum heating capacity will be afforded the windshield warmer. Stiffening elements or uprights 43 are arranged at opposite ends of the curtain 40 and designed to hold it in taut position to prevent its collapse when in operation.

To provide additional heat supply means, a sheet metal box 45 is mounted on the exhaust manifold or pipe 46 and has connected therewith a flexible hot air pipe 47 which extends up over the engine 60 and there branches out as shown at 48 and 49, said branches terminating in enlarged discharge mouths 50. These mouths 50 are preferably positioned adjacent the upper portion of the hood near the rear end thereof, as is shown clearly in Fig. 3 so that the hot air passing therethrough will be discharged in position to pass out under the apron 10 to the windshield.

Suitable supports in the form of braces 51 are provided for the pipes 47, 48 and 49 and these braces are secured to the engine by the engine bolts 61.

Referring again to the curtains which are provided to concentrate the warm air, it is, of course, to be understood that these may be varied in size to conform to the ventilators in connection with which they are to be used, and the elements 41 which extend along the upper edges of the curtains are preferably made in the form of coiled springs as shown in Fig. 11, said springs being about two inches more or less, shorter than the length of the curtains so as to adapt them to resiliently hold the curtains in operative position when the hooks 42 thereof are engaged with the slots of the ventilator.

While this device is primarily intended for use on automobiles and is so shown, obviously, it may be used in connection with flying machines, motor boats, or any other machine that has a windshield liable to freeze from moisture and snow, and to which heat may be supplied by any suitable means, either from the engine or otherwise.

It is also to be understood that suitable bumpers may be used to prevent the apron from scarring the machine in connection with which it is used, and to prevent rattling.

After the apron and its attachments have been assembled with the legs 23 resting on the portion of the cowl on which the back end of the hood usually rests, the hood is then brought down onto the extension and the spring catches which hold the hood in position are locked in operative relation, the parts all being in the position shown in Figs. 1 and 3, which provides sufficient space for the heated air from the engine to pass to the windshield.

This arrangement of the hot air device for directing air against the windshield, will keep the windshield warm and clean without any hot air being thrown into the face of the driver, such as occur were the device located within the car.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. The combination with a vehicle having a windshield and an engine, a hood and a cowl; of an apron having means for mounting it over the cowl between the windshield and the hood, said apron terminating short of the windshield and being spaced to provide an air passage from the engine to the windshield whereby hot air is discharged against the latter to prevent the accumulation of snow and ice.

2. A windshield warmer comprising an apron having means for mounting it on the cowl of an automobile and spacing it above said cowl to form an air passage between it and the cowl, means for securing said apron to the hood of the automobile and to prevent creeping of the apron relatively to the cowl.

3. A windshield warmer comprising an apron shaped to conform to the curvature of the car body in front of the windshield, means for mounting said apron on said body, and means whereby heated air is supplied under said apron and directed onto the windshield.

4. The combination with a motor vehicle having a windshield and an engine with a hood arranged over the engine, means carried by said hood for shutting out cold air to the hood, an apron conforming to the shape of the car between the hood and the windshield and spaced above the car with its front edge underlying the rear edge of the hood whereby the hot air from the engine may be conducted to the windshield.

ERWIN A. RINEHART.